United States Patent
Beermann et al.

(10) Patent No.: US 8,762,849 B2
(45) Date of Patent: Jun. 24, 2014

(54) METHOD AND DEVICE FOR DISPLAYING INFORMATION

(75) Inventors: Andreas Beermann, Stuttgart (DE); Arne Boess, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 979 days.

(21) Appl. No.: 12/532,842

(22) PCT Filed: Nov. 30, 2007

(86) PCT No.: PCT/EP2007/010427
§ 371 (c)(1),
(2), (4) Date: Sep. 24, 2009

(87) PCT Pub. No.: WO2008/119373
PCT Pub. Date: Oct. 9, 2008

(65) Prior Publication Data
US 2010/0064224 A1    Mar. 11, 2010

(30) Foreign Application Priority Data
Mar. 31, 2007 (EP) .................... 07006771

(51) Int. Cl.
*G06F 3/048* (2013.01)
*H04N 7/025* (2006.01)
*H04N 5/445* (2011.01)

(52) U.S. Cl.
USPC ............. 715/721; 715/808; 725/40; 348/570

(58) Field of Classification Search
USPC ................. 715/721, 784, 785, 719, 720, 808; 725/40, 43; 348/569, 570
See application file for complete search history.

(56) References Cited

U.S. PATENT DOCUMENTS

| | | | |
|---|---|---|---|
| 5,018,082 A * | 5/1991 | Obata et al. ................... | 715/707 |
| 5,428,400 A | 6/1995 | Landis et al. | |
| 5,500,680 A | 3/1996 | Lee | |
| 5,574,798 A * | 11/1996 | Greer et al. .................... | 382/100 |
| 5,629,733 A * | 5/1997 | Youman et al. ................. | 725/53 |
| 5,929,927 A | 7/1999 | Rumreich et al. | |
| 6,130,968 A * | 10/2000 | McIan et al. .................. | 382/309 |
| 7,136,080 B1 * | 11/2006 | Kaminagayoshi et al. ... | 345/619 |
| 7,493,640 B1 * | 2/2009 | Derrenberger et al. ......... | 725/42 |
| 2004/0036714 A1 * | 2/2004 | Blakely et al. ................ | 345/711 |
| 2005/0223411 A1 * | 10/2005 | Jung et al. ..................... | 725/135 |
| 2006/0015903 A1 * | 1/2006 | MacBeth et al. ............... | 725/46 |
| 2007/0052546 A1 * | 3/2007 | Minagawa et al. ........ | 340/815.4 |
| 2008/0256573 A1 | 10/2008 | Boess et al. | |

FOREIGN PATENT DOCUMENTS

| | | |
|---|---|---|
| CN | 1118645 A | 3/1996 |
| WO | 97 04591 | 2/1997 |
| WO | 98 27722 | 6/1998 |

* cited by examiner

Primary Examiner — Kieu Vu
Assistant Examiner — Blaine Basom
(74) Attorney, Agent, or Firm — Oblon, Spivak, McClelland, Maier & Neustadt, L.L.P.

(57) ABSTRACT

A method of displaying information on a screen, including providing the information, wherein the information is based on user text information, and displaying a predefined message on a screen, if the user text information is empty or invalid, otherwise displaying the user text information on the screen for a display time, wherein the display time depends on an amount and/or complexity of the user text information.

24 Claims, 7 Drawing Sheets

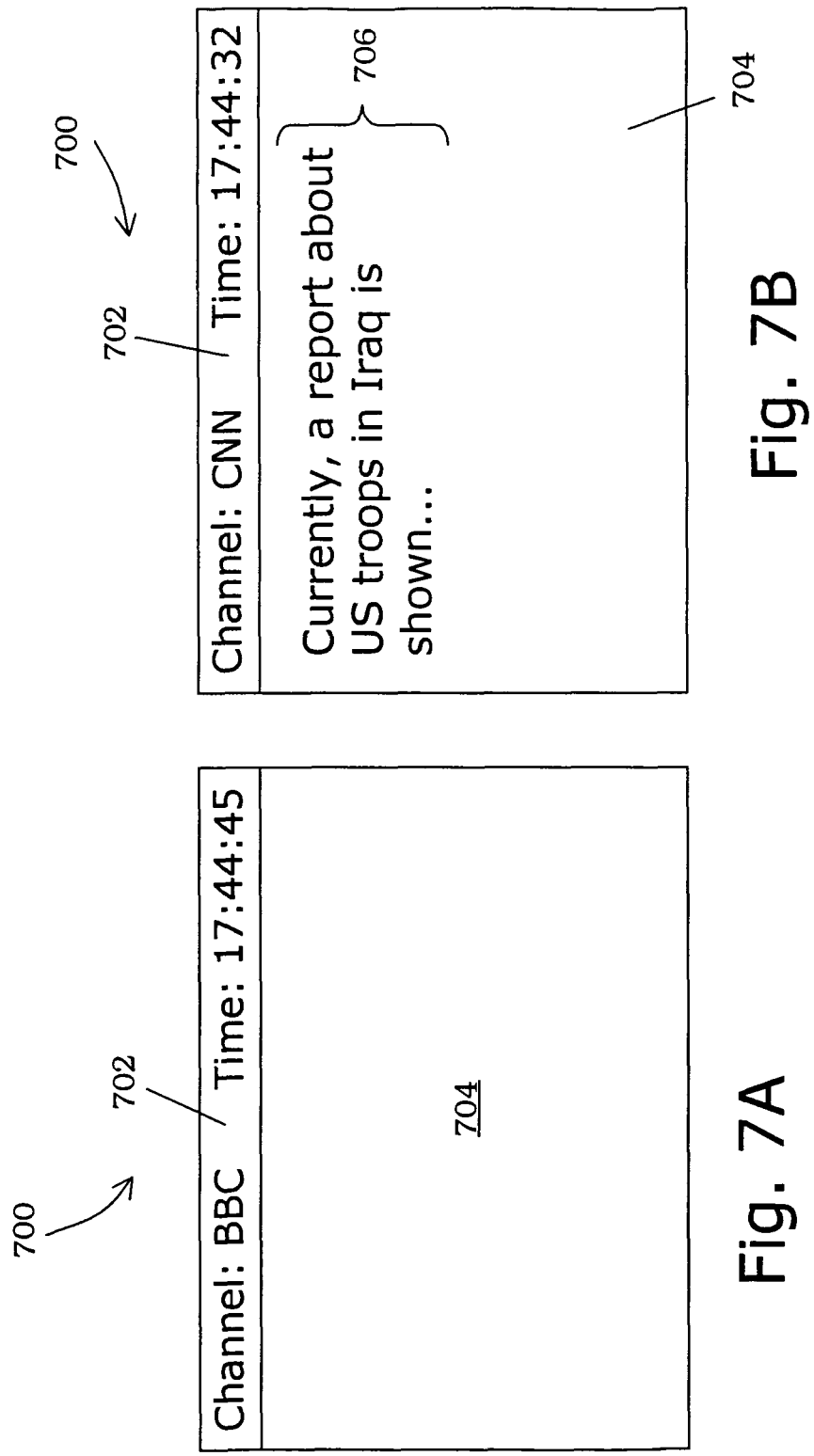

METHOD AND DEVICE FOR DISPLAYING INFORMATION

The invention relates to a method and device for displaying information as well as to a system for displaying information.

BACKGROUND OF THE INVENTION

Today, on screen display (OSD) has become a popular feature and is widely used e.g. for camcorders, digital versatile disc (DVD) recorders for providing various types of information to a user. For example, OSD information is used for guiding a user through a menu of a television set. Also, OSD may be used for displaying information to a user regarding a certain television program.

BRIEF SUMMARY OF THE INVENTION

It is an object of the invention to provide a method and device for displaying information in an improved way.

This object is solved by a method and device according to claims 1 and 11, respectively.

Further details of the invention will become apparent from a consideration of the drawings and ensuing description.

BRIEF DESCRIPTION OF THE SEVERAL VIEWS OF THE DRAWINGS

FIG. 7 shows an embodiment, where a predefined message is displayed, wherein, if user text information is available, the user text information is displayed in a part of the predefined message.

DETAILED DESCRIPTION OF THE INVENTION

Figure 1:
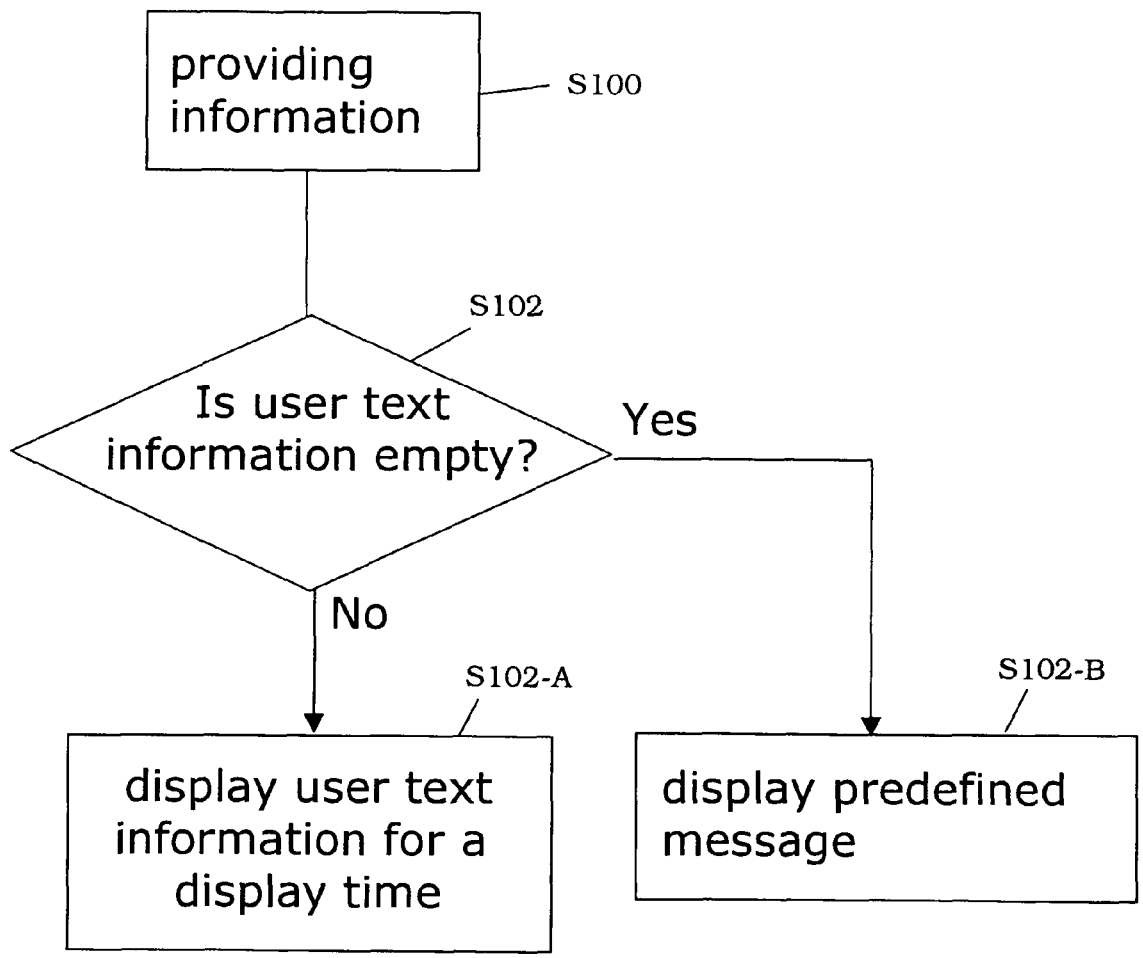
FIG. 1 shows an embodiment of a method of displaying information.

In the following, embodiments of the invention are described. It is important to note, that all described embodiments in the following may be combined in any way, i.e. there is no limitation that certain described embodiments may not be combined with others.

In an embodiment of the invention a method of displaying information comprises providing said information, wherein said information is based on user text information. The user text information may e.g. be variable and/or relate to e.g. a television program currently being viewed by a user and to a menu. The method may further comprise displaying a predefined message on a screen, if said user text information is empty or invalid, otherwise displaying said user text information on said screen for a display time, wherein said display time depends on an amount and/or complexity of the user text information. The predefined message may be displayed for a first display time and the user text information may be displayed for a second display time, wherein said first and second display time are both non-zero or non-vanishing. The method may also comprise checking if the information comprises user text information or not, wherein based on the checking it is determined whether the user text information is empty/invalid or not empty/invalid, i.e. the user text information does contain information intended to be displayed to the user such as e.g. information regarding a currently viewed television program and/or information of a menu of a device such as e.g. a VCR, DVD recorder, hard disc recorder or the like. The displaying of the predefined message and/or of the user text information may be done in an on screen display (OSD) style, i.e. a currently viewed television program may be shown in the background of the predefined message/user text information. Also, the predefined message and/or user text information may be displayed translucent.

As may be apparent from the above, according to the described embodiment of the invention, a message may be displayed on the screen in any case, i.e. even if there is no user text information available. In this case a predefined message will be displayed. If user text information is available, the user text information will be displayed on the screen for the display time. In a further embodiment, if the amount of the user text information is e.g. large or complex or important, then the display time may be set to a longer period of time than for a small amount of user text information. Thus, if the amount of said user text information is large, complex and/or important, the user may have sufficient time for reading the user text information. On the other hand, if the amount of user text information is small, simple or not important, the user may not need a long time for reading the user text information and the user text information will only be displayed for a small period of time. Thus, the user will not be bothered for a long period of time with a displayed message. Thus, the user may continue watching a television program more quickly, i.e. without a long interruption. In other words, if the user text information is short, the running television program will only be disturbed for a short period of time, else if the user text information is long, the user may have sufficient time to read the user text information.

In a further embodiment of the invention, the amount of user text information may be determined by determining a number of characters or a number of words of said user text information. Further, the display time may be determined by adding a predetermined, e.g. fixed period of time and a variable period of time which depends on the amount and/or complexity of the user text information. Thus, the display time may be determined according to the following formula:

$$\text{timeout} = \text{base\_timeout} + \text{number\_of\_characters\_to\_be\_displayed} \times \text{time\_factor}$$

wherein timeout=number of milliseconds for which the user text information will be displayed, i.e. number of milliseconds to wait until the message (predefined message or user text information) will disappear, base_timeout=number of milliseconds to wait at least, even if no information is available, i.e. the user text information is empty or invalid, number_of_characters_to_be_displayed=number of characters of the user text information, time_factor=number of milliseconds to wait per character.

Some reasonable values may be: base_timeout=1000 milliseconds and time_factor=70 milliseconds per character.

In another embodiment, it is possible to additionally take into account a number of words of the user text information, i.e. determine the amount of user text information by determining a number of words of said user text information.

The variable period of time that is added to a base time, thus, may be determined by multiplying a time factor, i.e. a display time factor, and the number of characters or the number of words.

In a further embodiment, the complexity of the user text information may be determined by determining a number of lines and a number of pixels needed for displaying the user text information. For example, the user text information may be displayed in a box, and the complexity of the user text information is determined depending on the number of pixels of the box.

In a further embodiment, the predefined message may be displayed exactly for the predetermined period of time. Thus, according to this embodiment, a message will be displayed at least for the determined period of time, even if no user text information is available. On the other hand, if user text information is available, the display time will be prolonged according to the amount and/or complexity of the user text information.

In a further embodiment, the method may also comprise determining a television program that is currently displayed on the screen, and receiving the information, wherein the information is descriptive of the television program. This may be useful, if the user changes the television channel and starts watching a new program. In this case, e.g. a description of the new television program may be displayed to the user on the screen. Thus, the user gets information about the television program. The information may be received from a server, a set top box or a DVD recorder. The information may e.g. be received via the same channel as the TV signal. Thus, the information may be included in the television signal being received by the television or set top box or recording device, e.g. hard disc recorder or digital versatile disc recorder (DVD recorder).

In a further embodiment, if said number of characters is below a predefined threshold, said display time may be set to a predetermined period of time, and else if said number of characters is above or equal to said predefined threshold, the display time may be determined by adding a predetermined period of time and the product of the number of characters and a predefined time factor. Thus, in this embodiment, a message may be displayed for a predetermined, e.g. fixed amount of time, if no or only few information is available. On the other hand, if a large amount of information is available exceeding the predefined threshold, the text may be displayed for a longer period of time that is sufficient for the user to read all of the text.

In a further embodiment, the predefined message may comprise a box having a header line and a remaining part, wherein said header line may be used for displaying general and/or technical information such as e.g. program number, provider name, sound system (mono/stereo/surround) etc.

Still further, if said user text information is not empty or not invalid, the predefined message may be displayed together with the user text information for the same period of time, wherein the user text information is displayed in the remaining part. Thus, if the user text information is empty or invalid, the box with header line is displayed and the remaining part remains empty, wherein if the user text information is not empty or not invalid, the user text information is displayed in the remaining part of the box.

The predefined message and/or the user text information may be displayed in a box, wherein a size of the box may depend on the amount and/or complexity of the predefined message and user text information, respectively. By varying the size of the box, the user may only be disturbed as much as necessary. A television program currently being viewed may be disturbed only as much as necessary.

In a further embodiment, the predefined message may correspond to a graphical element and/or a text message. The text message may indicate that e.g. currently no user text information is available. For example, if the user would expect that a description of a currently viewed television program would occur, the predefined text message may say "no program information available". Thus, the user may notice that no information is available, because the predefined message will be displayed.

In a further embodiment, the user text information may correspond to short information or long information of electronic program guide (EPG) information. Generally, electronic program guide information has two different types of program information, i.e. short information and long information. Short information corresponds to one line of description of a predetermined program and long information may be a longer description of a current or predefined program. The long information may comprise several 100 to 1000 characters and may wrap over several pages.

In a further embodiment of the invention, a television may comprise a screen configured to display a television program or television channel or moving picture and user information. The television may further comprise an information receiving mechanism configured to receive information regarding the television program or an operating menu of the television. Further, the television may comprise a screen control mechanism configured to control the screen, which screen control mechanism causes a predetermined message to be displayed on the screen, if no or invalid information has been received by the information receiving mechanism, otherwise said screen control mechanism causes said information to be displayed on said screen for a display time, wherein the display time depends on an amount and complexity of the information.

In a further embodiment, the user text information may be provided to the information receiving mechanism according to the consumer electronics control standard (CEC). Further, the information to be displayed may be provided by playback devices such as e.g. DVD playback/recording devices, Blu-Ray-disc players/recorders, hard disc, DVD recorders/players, etc. At the moment, according to the CEC-standard, only very short messages may be transferred from a playback device to the television. But in the future it might be possible to transmit larger text messages. When the television receives the user text information based on the CEC standard, the television may generate the predefined message and display time based on the user text information. In other words, in this embodiment, a set top box may simply send user text information to the television and the television manages the displaying of the user text information. That is, if the user text information is empty or invalid, a predefined message is displayed on the screen, otherwise, the user text information is displayed on a screen for a display time, wherein the display time depends on the amount and complexity of the user text information provided by the set top box.

The television may also comprise a switching mechanism configured to switch the television program, wherein upon switching to a television program, the information receiving mechanism receives the information related to the television program and said screen control mechanism causes said information to be displayed on the screen. In this embodiment, if the user switches to a new channel or new television program, on the screen of the television, user text information describing the new television program may be displayed.

According to a further embodiment of the invention, a device, e.g. television accessory or equipment device, set top box, recording device, receiver, tuner or the like, may comprise a television tuning mechanism configured to tune to a television program, an information receiving mechanism configured to receive information regarding the television program or an operating menu of the device, and a signal processing mechanism configured to generate an output signal for a television, which output signal causes a predefined message to be displayed on a screen of the television, if no or invalid information has been received by the information receiving mechanism, otherwise the output signal causes the information to be displayed on the screen for a display time, wherein the display time depends on an amount and/or complexity of the information.

In a further embodiment, the device may comprise a switching mechanism configured to switch the television program, wherein upon switching to the television program, the information receiving mechanism receives the information and the output signal causes the information to be displayed on the screen.

The information receiving mechanism may request and receive the information from an external server when a switching operation occurs. In other words, in this embodiment, information may only need to be transmitted if the user switches the channel/television program.

A method for displaying information on a screen, wherein said information either comprises user text information or not, may comprise displaying a predefined message on the screen, if the information does not comprise user text information, otherwise displaying said user text information on said screen for a display time, wherein the display time depends on an amount and/or complexity of the user text information.

Further, a method for displaying information on a television screen may be provided, said information having been received from a server and being related to a television program currently being viewed by a user on the television screen, the method comprising: displaying a predefined message on the screen, if the information does not comprise user text information, otherwise displaying said user text information on the screen for a period of time, wherein the period of time depends on an amount and/or complexity of the user text information.

Further, a method for displaying information on a screen may be provided, said information either comprising user text information or not, said method comprising: displaying a predefined message on the screen for exactly a time period A, if said information does not comprise user text information, otherwise displaying said user text information on said screen for a display time, wherein said display time is determined by adding said time period A and a product of a number of characters of said user text information and a predetermined time factor.

Further, a television may be provided, comprising: a screen configured to display information, said information either comprising user text information or not, and a screen control mechanism configured to control the screen, which screen control mechanism causes a predefined message to be displayed on the screen, if said information does not comprise user text information, otherwise said screen control mechanism causes said user text information to be displayed on the screen for a display time, wherein the display time depends on an amount and/or complexity of the user text information.

Further, a system may be provided, comprising: a server configured to provide information regarding at least one television program, and a receiving device receiving a television signal and program information from said server. Said receiving device may comprise a television tuning mechanism configured to tune to a television program, television channel or moving picture, an information receiving mechanism configured to receive information regarding said television program from said server, and a signal processing mechanism configured to generate an output signal for a television, which output signal causes a predefined message to be displayed on a screen of the television, if no or invalid information has been received by the information receiving mechanism, otherwise said output signal causes said information to be displayed on the screen for a display time, wherein the display time depends on an amount and complexity of the information.

FIG. 1 shows steps according to an embodiment of the invention. In step S100, information is provided. The information comprises user text information, e.g. related to a television program. In step S102 it is checked whether the user text information is empty or not. If said user text information is empty, a predefined message will be displayed on a screen in step S102-B. The predefined message may say "no information available".

If the user text information is not empty or not invalid, i.e. there is user text information available, in step S102-A, the user text information will be displayed on the screen for a display time. The display time may depend on an amount and/or complexity of the user text information. Thus, if there is a lot of user text information available, the user text information will be displayed for a longer period of time sufficient for the user to read the user text information. On the other hand, if no user text information is available, the predefined message may be displayed only for a short period of time. Nevertheless, in each case a message will be displayed.

Figure 2:
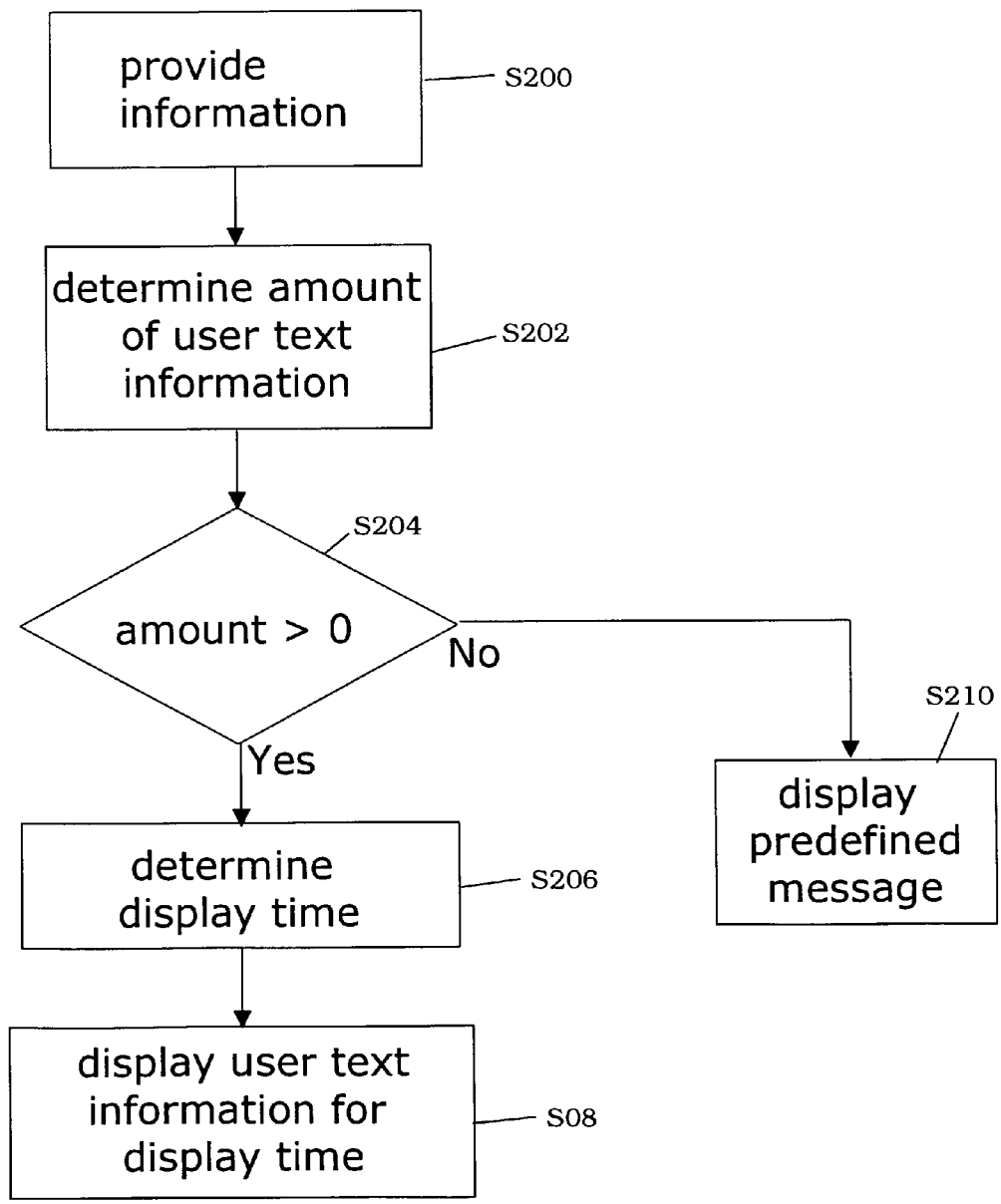
FIG. 2 shows a further embodiment of a method of displaying information.

FIG. 2 shows a further embodiment of a method of displaying information. In a providing step S200, information is provided. The information comprises user text information. In step S202, the amount of the user text information is determined e.g. based on the number of characters or words of the user text information. In step S204, it is checked whether the user text information is empty or contains text to be displayed, i.e. it is checked whether the amount determined in step S202 is larger than zero characters or not. If the user text information comprises text to be displayed, i.e. the amount of user text information is larger than zero, in step S206, a display time will be determined. The display time may be determined based on the amount of user text information. The display time may be calculated according to the following formula:

$$timeout = base\_timeout + number\_of\_characters\_to\_be\_displayed \times time\_factor$$

wherein:

timeout=number of milliseconds for which the user text information will be displayed, base_timeout=number of milliseconds to wait at least, even if no information is available, number_of_characters_to_be_displayed=number of characters of the user text information, time_factor=number of milliseconds to wait per character.

In another embodiment, the display time may be determined according to the following formula:

$$timeout = \begin{cases} base\_timeout: \text{no information available or} \\ \quad number\_of\_characters < threshold \\ base\_timeout + number\ of\ characters \times \\ \quad time\_factor: number\_of\_characters \geq threshold \end{cases}$$

The timeout value determined by one of the above formulas denotes the display time, i.e. the user text information or predetermined message will be displayed for a time period defined by the timeout value.

Then, in step S208 the user text information will be displayed for the determined display time.

On the other hand, if in step S204, it is determined that the user text information is empty or invalid, i.e. the amount of user text information is equal to zero, then a predefined message will be displayed in step S210. The predefined message may be displayed for a predetermined period of time.

Figure 3:
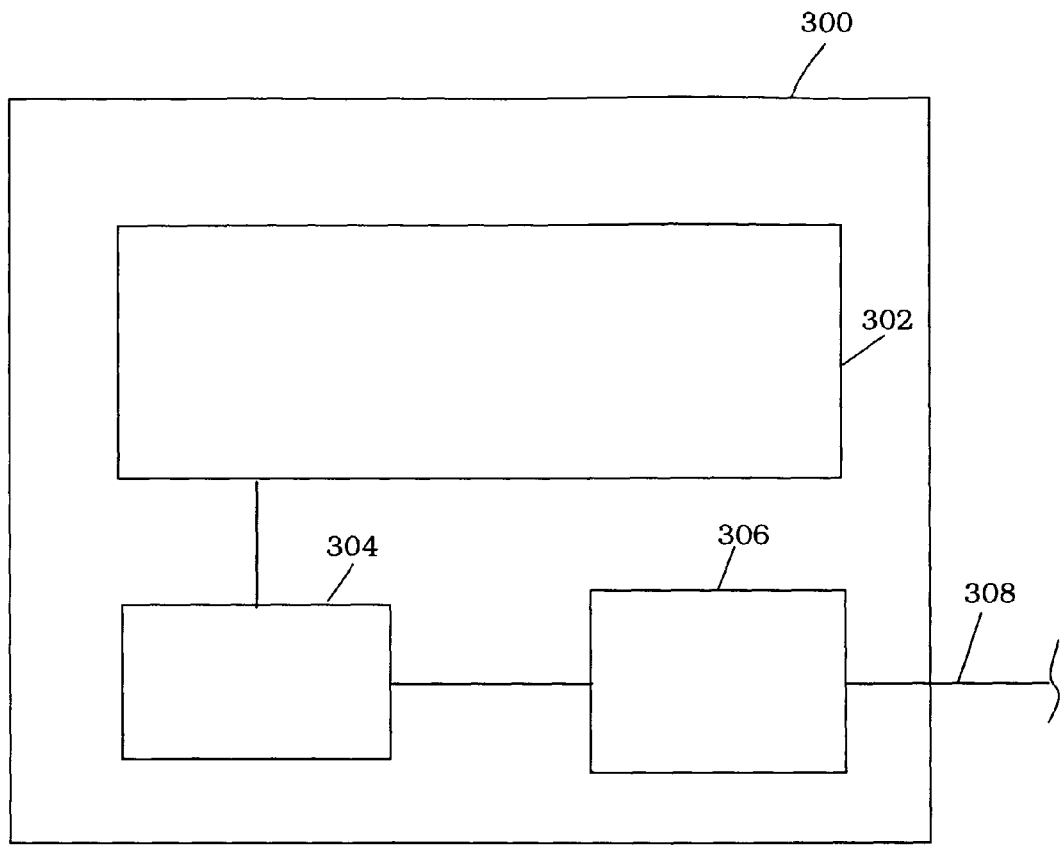
FIG. 3 shows an embodiment of a device for displaying information.

FIG. 3 shows a television 300 being connected to an antenna cable 308. Television 300 comprises a screen 302, a screen control mechanism 304, and an information receiving mechanism 306. The screen is configured to display a television program being received via said antenna cable 308. The information receiving mechanism 306 may be configured to receive information regarding a currently viewed television program or an operating menu of the television. The information regarding the television program may also be received via said antenna cable 308. In a further embodiment, the information regarding the television program may also be provided via a further cable and or wireless connection (not shown in FIG. 3). In this case there would e.g. be a further connection between the information receiving mechanism 306 and e.g. an external server providing the program information.

The screen control mechanism 304 may receive the information received by the information receiving mechanism 306 and may be configured to control the screen, wherein the screen control mechanism 304 may cause a predefined message to be displayed on the screen, if no or invalid information has been received by the information receiving mechanism, otherwise screen control mechanism 304 may cause the information to be displayed on the screen for a display time, wherein the display time may depend on an amount and complexity of the information.

Figure 4:
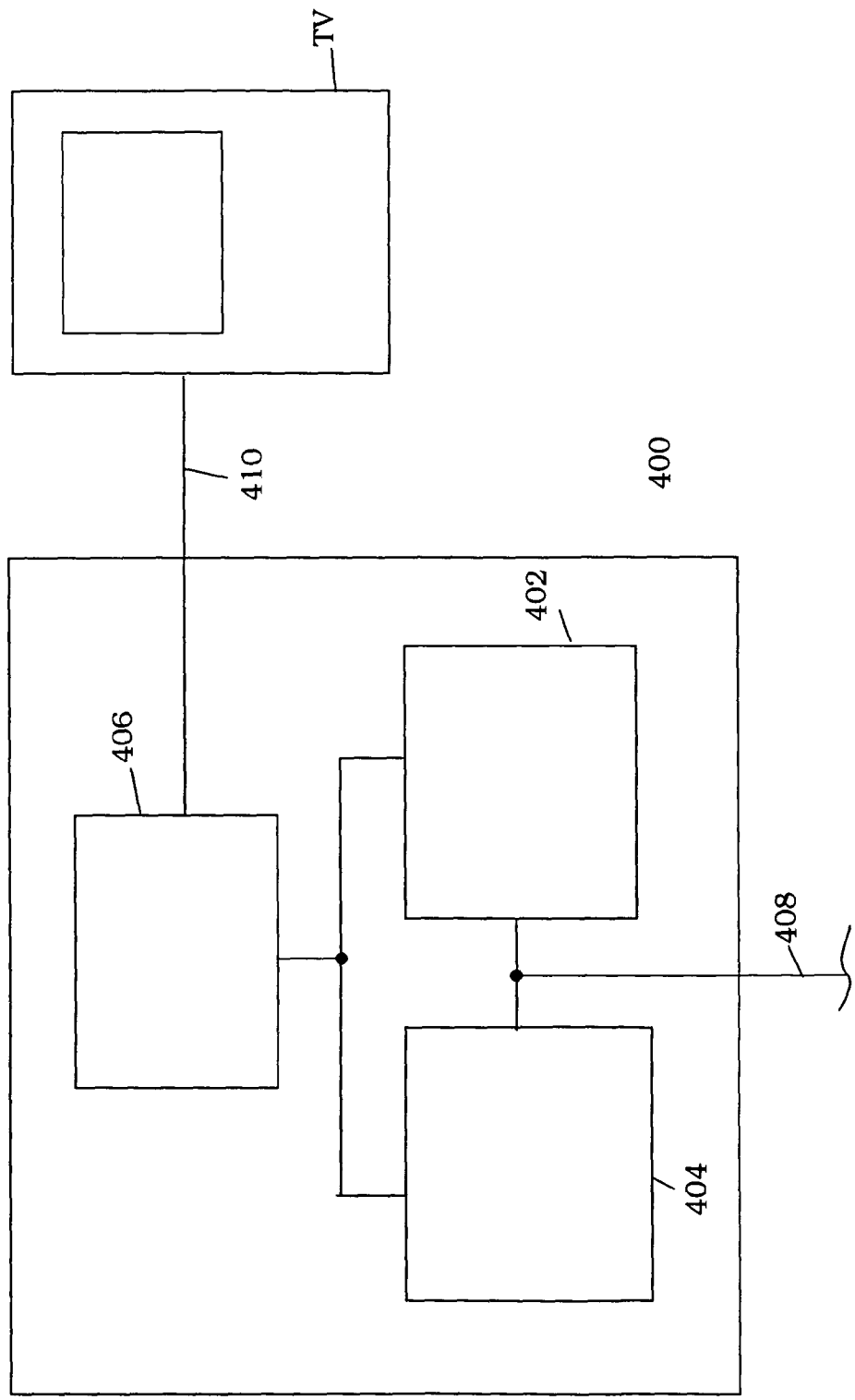
FIG. 4 shows a further embodiment of a device for displaying information.

FIG. 4 shows a recording device 400 comprising a television tuning mechanism 402, an information receiving mechanism 404 and a signal processing mechanism 406. Recording device 400 is connected to an antenna cable 408 and to a television TV via a cable 410. Recording device 400 provides a television signal to the television TV via cable 410.

The television tuning mechanism 402 may be configured to tune to a television program, and the information receiving mechanism 404 may be configured to receive information regarding the television program or an operating menu of the recording device 400. The signal processing mechanism 406 may be configured to generate the television signal to be provided to television TV via cable 410. The output signal causes a predefined message to be displayed on the screen of a television, if no or invalid information has been received by the information receiving mechanism 404, otherwise the output signal causes the information to be displayed on the screen for a display time, wherein the display time depends on the amount and/or complexity of the information.

Figure 5:
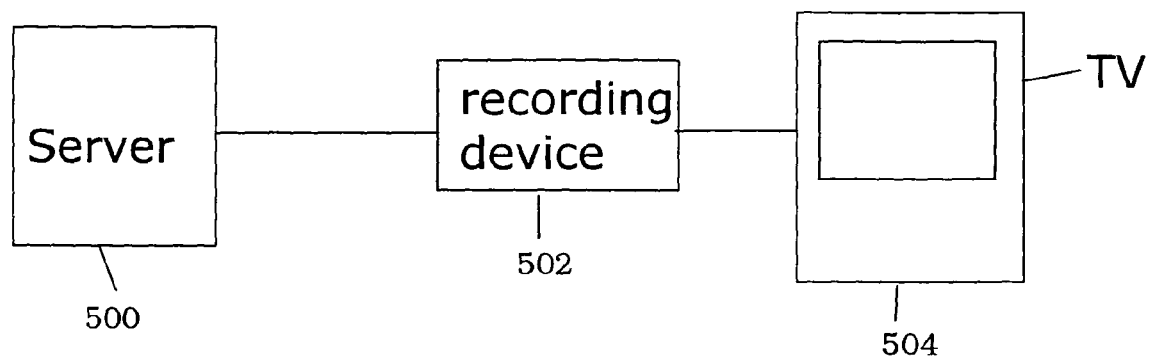
FIG. 5 shows an embodiment of a system for displaying information on a television.

FIG. 5 shows an embodiment of the invention with a server 500, set top box 502 and television 504. Server 500 may provide information to be displayed on a screen of said television 504. The information may be continuously provided by server 500 to set top box 502 or set top box 502 may request the information from server 500 upon switching a television program. In other words, if the user changes the television program currently being tuned to by the set top box 502, set top box 502 may request information regarding the new television program from server 500. Thus, no bandwidth of the connection between server 500 and set top box 502 be wasted if a channel is not switched.

As described above, set top box 502 may provide a television signal to television 504, which television signal causes a predefined message to be displayed on the screen of the television, if no or invalid information has been received, otherwise the output signal causes the information to be displayed on the screen for a display time, wherein the display time depends on an amount and/or complexity of the information. The television signal may comprise the messages to be displayed within the video signal or the message to be displayed may be generated by the television based on information included into the television signal.

Figure 6:
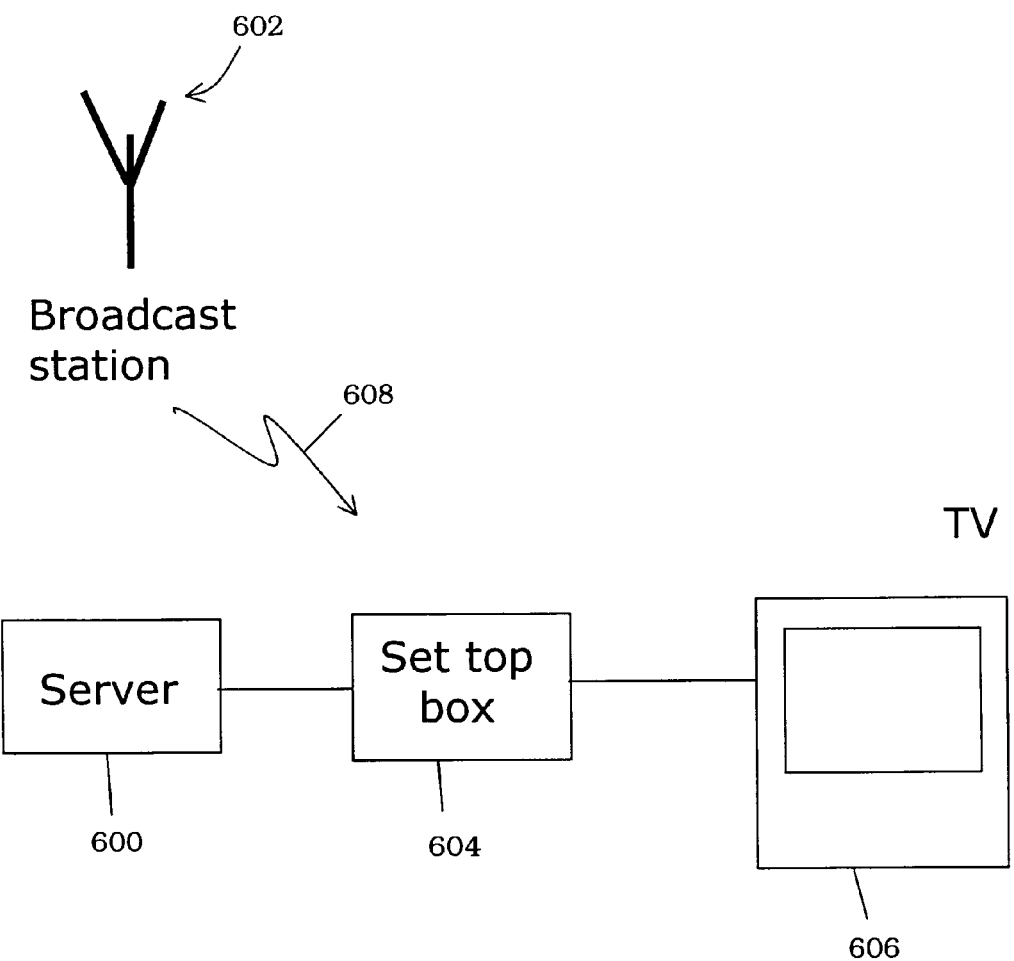
FIG. 6 shows an embodiment of a system for displaying information on a television, wherein a broadcast station provides the television signal.

FIG. 6 shows an embodiment of the invention comprising a server 600, a broadcast station 602, a set top box 604, and a television 606. Broadcast station 602 transmits a television signal 608 to set top box 604. Based on the television signal 608, set top box 604 decodes and generates a television signal for television 606. Set top box 604 may be controlled by the user, i.e. the user may tune set top box 604 to a certain television channel. Depending on the channel, set top box 604 may request program information from server 600 regarding a television program currently shown on a selected channel. Upon switching to a new channel, set top box 604 may request and receive respective program information from server 600. If set top box 604 receives valid program information from server 600, then set top box 604 causes the program information to be displayed on the screen of television 606 for a display time, wherein the display time depends on the amount and complexity of the program information. This may be done by modifying the video signal, i.e. the video signal transmitted from set top box 604 to television 606 may comprise the program information. Or, it is possible, that the program information be transmitted to television 606 and television 606 mixes the video signal received from set top box 604 together with the program information, i.e. the television 606 blends in the program information into the currently shown video picture.

FIG. 7a shows a predefined message 700 comprising a header line 702 and a remaining part 704. Predefined message 700 has the form of a box and remaining part 704 is of rectangular shape. In header line 702 technical information or other user information may be displayed. In the example of FIG. 7a, in header line 702, it is displayed what channel is currently shown (in the example BBC) and what time it is, in the example 17:44:45.

This predefined message 700 may e.g. be displayed if no user text information is available regarding the currently shown television program of BBC. Thus, this predefined message 700 may be shown if the user e.g. switches to channel BBC for a predetermined amount of time.

FIG. 7b shows predefined message 700, wherein in said remaining part 704, user text information 706 is displayed. Predefined message 700 together with user text information 706 may be displayed on the television screen if valid user text information has been received. In the example of FIG. 7b the user may have just switched to channel CNN. Thus in header line 702, the respective channel is shown (CNN) and the time (17:44:32). Since valid program information regarding the currently shown program on CNN is available, this program information (user text information) 706 is shown in said remaining part 704. In the example of FIG. 7b, the user text information is "Currently, a report about US troops in Iraq is shown . . . ".

Thus, according to the embodiment of FIGS. 7a and 7b, when the user switches the channel or when the user operates a respective request button requesting information, the predefined message will always be displayed. However, if no program information is available, the predefined message will disappear after a predetermined e.g. short period of time. On the other hand, if program information is available, then the program information 706 will be displayed in the remaining area 704 of predetermined message 700 and the display time of the predefined message and the program information (user text information) will depend on the amount and/or complexity of the program information.

In other words, if no program information is available, then more or less an empty box having a header line is displayed, whereas, if program information is available, then the program information will be displayed in the box.

The following elucidations may help a person skilled in the art to get a better understanding of the above:

Upon channel changes digital television receivers may display an information box containing event description of the current channel (short information). This information box may be annoying when no or only small information is available. Therefore, as described above, the timeout, i.e. the display time, of the information display may be chosen to be dependent on the amount of information to be displayed.

Thus, the customer notices that no information is available, because the predefined message will be displayed.

If the user text information is short, the running television program will only be disturbed for a short period of time.

The invention claimed is:

1. A method of displaying information on a screen, comprising
    providing said information, wherein said information is based on user text information;
    displaying a predefined message on a screen, if said user text information is empty or invalid, otherwise displaying said user text information on said screen for a display time, wherein said display time is determined by adding a constant predetermined period of time and a variable period of time which depends on an amount and/or complexity of said displayed user text information, wherein said predefined message is displayed exactly for said constant predetermined period of time, wherein a television channel that is currently displayed on said screen is determined, and wherein said predefined message depends on said television channel.

2. Method according to claim 1, wherein said amount of user text information is determined by determining a number of characters or words of said user text information.

3. Method according to claim 2, wherein, if said number of characters is below a predefined threshold, said display time is set to the constant predetermined period of time, else if said number of characters is above or equal to said predefined threshold, display time is determined by adding said constant predetermined period of time and the product of said number of characters and a predefined time factor.

4. Method according to claim 1, wherein said complexity of the user text information is determined by determining a number of lines and/or a number of pixels needed for displaying said user text information.

5. Method according to claim 1, wherein said variable period of time is determined by multiplying a time factor and a number of characters.

6. Method according to claim 1, wherein a television program that is currently displayed on said screen is determined and said information is descriptive of said television program.

7. Method according to claim 1, wherein said predefined message comprises a box having a header line and a remaining part, wherein said header line is used for displaying technical information.

8. Method according to claim 7, wherein, if said user text information is not empty or not invalid, said predefined message is displayed together with said user text information, wherein said user text information is displayed in said remaining part.

9. Method according to claim 1, wherein said predefined message and/or said user text information are displayed in or as a box, wherein a size of said box depends on said amount and/or complexity of said predefined message and user text information, respectively.

10. Method according to claim 1, wherein said predefined message corresponds to a graphical element and/or a text message.

11. Method according to claim 1, wherein said screen is a television screen.

12. Method according to claim 1, wherein said user text information corresponds to short information or long information of electronic program guide (EPG) information.

13. Television comprising:
    a screen configured to display a television program and/or user information;
    an information receiving mechanism configured to receive user text information regarding said television program or an operating menu of said television;
    a screen control mechanism configured to control said screen, which screen control mechanism causes a predefined message to be displayed on said screen, if said user text information is empty or invalid, otherwise said screen control mechanism causes said user text information to be displayed on said screen for a display time, wherein said display time is determined by adding a constant predetermined period of time and a variable period of time which depends on an amount and/or complexity of said displayed user text information, wherein said predefined message is displayed exactly for said constant predetermined period of time, wherein a television channel that is currently displayed on said screen is determined, and wherein said predefined message depends on said currently displayed television channel.

14. Television according to claim 13, wherein said user text information is provided to said information receiving mechanism according the consumer electronics control standard (CEC).

15. Television according to claim 13, comprising:
    a switching mechanism configured to switch said television program, wherein, upon switching to said television program, said information receiving mechanism receives said user text information.

16. A device comprising:
    a television tuning mechanism configured to tune to a television program;
    an information receiving mechanism configured to receive information regarding said television program or an operating menu of said device;
    a signal processing mechanism configured to generate an output signal for a television, which output signal causes a predefined message to be displayed on a screen of said television, if no or invalid information has been received by said information receiving mechanism, otherwise said output signal causes said information to be displayed on said screen for a display time, wherein said display time is determined by adding a constant predetermined period of time and a variable period of time which depends on an amount and/or complexity of said displayed information, wherein said predefined message is displayed exactly for said constant predetermined period of time, wherein a television channel that is currently displayed on said screen is determined, and wherein said predefined message depends on said television channel.

17. Device according to claim 16, comprising:
 a switching mechanism configured to switch said television program, wherein, upon switching to said television program, said information receiving mechanism receives said information and said output signal causes said information to be displayed on said screen.

18. Device according to claim 17, wherein upon switching, said information receiving mechanism requests and receives said information from an external server.

19. A non-transitory computer readable medium including computer program instructions that cause a computer to execute a method of displaying information comprising:
 displaying a predefined message on a screen, if user text information is empty or invalid, otherwise displaying said user text information on said screen for a display time, wherein said display time is determined by adding a constant predetermined period of time and a variable period of time which depends on an amount and/or complexity of said displayed user text information, wherein said predefined message is displayed exactly for said constant predetermined period of time, wherein a television channel that is currently displayed on said screen is determined, and wherein said predefined message depends on said television channel.

20. A method for displaying information on a screen, said information either comprising user text information or not, said method comprising:
 displaying a predefined message on said screen, if said information does not comprise user text information, otherwise displaying said user text information on said screen for a display time, wherein said display time is determined by adding a constant predetermined period of time and a variable period of time which depends on an amount and/or complexity of said displayed user text information, wherein said predefined message is displayed exactly for said constant predetermined period of time, wherein a television channel that is currently displayed on said screen is determined, and wherein said predefined message depends on said television channel.

21. A method for displaying information on a television screen, said information having been received from a server and being related to a television program currently being viewed by a user on said television screen, said method comprising:
 displaying a predefined message on said screen, if said information does not comprise user text information, otherwise displaying said user text information on said screen for a display time, wherein said display time is determined by adding a constant predetermined period of time and a variable period of time which depends on an amount and/or complexity of said displayed user text information, wherein said constant predefined message is displayed exactly for said predetermined period of time, wherein a television channel that is currently displayed on said screen is determined, and wherein said predefined message depends on said television channel.

22. A method for displaying information on a screen, said information either comprising user text information or not, said method comprising:
 displaying a predefined message on said screen for exactly a constant time period A, if said information does not comprise user text information, otherwise displaying said user text information on said screen for a display time, wherein said display time is determined by adding said constant time period A and a product of a number of characters of said user text information and a predetermined time factor, wherein a television channel that is currently displayed on said screen is determined, and wherein said predefined message depends on said television channel.

23. A television comprising:
 a screen configured to display information, said information either comprising user text information or not;
 a screen control mechanism configured to control said screen, which screen control mechanism causes a predefined message to be displayed on said screen, if said information does not comprise user text information, otherwise said screen control mechanism causes said user text information to be displayed on said screen for a display time, wherein said display time is determined by adding a constant predetermined period of time and a variable period of time which depends on an amount and/or complexity of said displayed user text information, wherein said predefined message is displayed exactly for said constant predetermined period of time, wherein a television channel that is currently displayed on said screen is determined, and wherein said predefined message depends on said television channel.

24. A system comprising:
 a server adapted to provide information regarding at least one television program;
 a television tuning mechanism configured to tune to a television program;
 an information receiving mechanism configured to receive information regarding said television program from said server;
 a signal processing mechanism configured to generate an output signal for a television, which output signal causes a predefined message to be displayed on a screen of said television, if no or invalid information has been received by said information receiving mechanism, otherwise said output signal causes said information to be displayed on said screen for a display time, wherein said display time is determined by adding a constant predetermined period of time and a variable period of time which depends on an amount and/or complexity of said displayed information, wherein said predefined message is displayed exactly for said constant predetermined period of time, wherein a television channel that is currently displayed on said screen is determined, and wherein said predefined message depends on said television channel.

* * * * *